May 13, 1969 F. C. DOUGHTY 3,444,536

MAGNETIC THIN FILM MEMORY ASSEMBLY

Filed Aug. 27, 1965 Sheet 1 of 3

INVENTOR.
FREDERIC C. DOUGHTY

BY Samuel Kane

ATTORNEY

INVENTOR.
FREDERIC C. DOUGHTY
BY
Samuel Kane
ATTORNEY

INVENTOR.
FREDERIC C. DOUGHTY
BY Samuel Kane
ATTORNEY

United States Patent Office 3,444,536

Patented May 13, 1969

3,444,536

MAGNETIC THIN FILM MEMORY ASSEMBLY

Frederic C. Doughty, Valley Forge, Pa., assignor to Burroughs Corporation, Detroit, Mich., a corporation of Michigan Filed Aug. 27, 1965, Ser. No. 483,098
Int. Cl. G11b *5/00*
U.S. Cl. 340—174 8 Claims

ABSTRACT OF THE DISCLOSURE

A magnetic memory device is constructed of a laminated assembly of substrates, each containing thin films and/or vacuum-deposited conductors. The thin films are arranged in two layers in the assembly with certain of the conductors extending between and inductively coupled to pairs of the thin films. The use of paired films provides improved magnetic performance and increased signal output. Vacuum depositing of the conductors provides for ultrathin conductors whereby maximum flux coupling between the films of each pair is obtained. None of the conductors on any one substrate intersect, and the substrates are oblong and orthogonal so as to expose the terminal portions of all conductors for external connection.

This invention relates generally to magnetic memory devices and more particularly to a magnetic memory device for storing information in data processing and computing systems.

In certain of the prior art magnetic memory devices an attempt has been made to utilize intersecting conductors on certain substrates and to obtain maximum magnetic flux coupling between the magnetic storage media and their associated components by making the conductors as thin as possible. In one attempt, one group of conductors was deposited on a substrate in an ultrathin configuration by the utilization of vacuum evaporation techniques. This was followed by a thin coating of insulating material, also applied by vacuum evaporation techniques, and then a second group of conductors was similarly deposited on the substrate over the layer of insulating material in intersecting relation with the first group of conductors. While these vacuum evaporation depositions constituted a desirable ultrathin construction, the process was not altogether successful because the layer of insulation was in many cases found to be defective in that it contained pinholes, so that the second group of conductors short-circuited through the pin-holes.

Prior art magnetic memory devices have also been subject to certain other limitations, particularly in the case where the magnetic storage media have been in the form of thin film elements of bistable state magnetic storage material. For example, the magnetic thin films are open loop devices and therefore their flux lines return through an air path. Such films have therefore been susceptible to stray magnetic fields. Thin films have also been limited in their ability to store information because of their own demagnetizing field. Furthermore, when an input conductor associated with a particular thin film was energized in read or write operations, the magnetic field set up by its return conductor had a disturbing effect upon adjacent thin films.

An object of the invention, therefore, is to provide a magnetic memory device with improved performance.

Another object of the invention is to provide a magnetic memory device which makes it more feasible to utilize ultrathin conductive platings or depositions.

Another object of the invention is to provide a magnetic memory device with ultrathin conductors whereby maximum flux coupling of magnetic storage media may be obtained.

A further object of the invention is to provide a magnetic memory device utilizing substrates and in which none of the conductors on any one substrate overlap, and in which the existence of pinholes in the insulation is therefore insignificant.

Another object of the invention is to provide a magnetic memory device in which the influence of stray magnetic fields is significantly reduced.

A further object of the invention is to provide a magnetic memory device in which the demagnetizing fields of the magnetic storage media are also reduced.

Another object of the invention is to provide a magnetic memory device in which the effect of disturbing magnetic fields is substantially cancelled.

A further object of the invention is to provide a magnetic memory device with increased signal output.

Still a further object of the invention is to provide a magnetic memory device in the form of a laminated assembly of substrates containing conductors and magnetic storage media, and in which the substrates are constructed and oriented so as to expose the terminal portions of all conductors for external connection.

A further object of the invention is to provide a magnetic memory device which is low in cost and simple to fabricate.

In accordance with the above objects, and considered first in one of its broader aspects, the invention comprises an assembly of first and second layers of elements of multistable state magnetic storage material in which the layers are spaced and are in superposed relation, and wherein the elements of each layer coincide with the elements of the other layer to form pairs of elements. A plurality of input conductors is provided, wherein each input conductor is inductively coupled to and extends between each pair of elements of a plurality of pairs of elements, and wherein there is further provided at least one pair of return conductors adapted to be connected to at least one of the input conductors, the return conductors being arranged in mutual magnetic flux-cancelling relation.

The invention will be more clearly understood when the following detailed description of the preferred embodiment thereof is read in conjunction with the accompanying drawings in which FIG. 1 is an isometric view of a magnetic memory assembly constructed in accordance with the invention;

Turning now to the details of the illustrated embodiment of the invention, a plurality of substrates 10, 12, 14 and 16 (FIG. 1) are arranged in the form of a laminated assembly 18.

Figure 2:
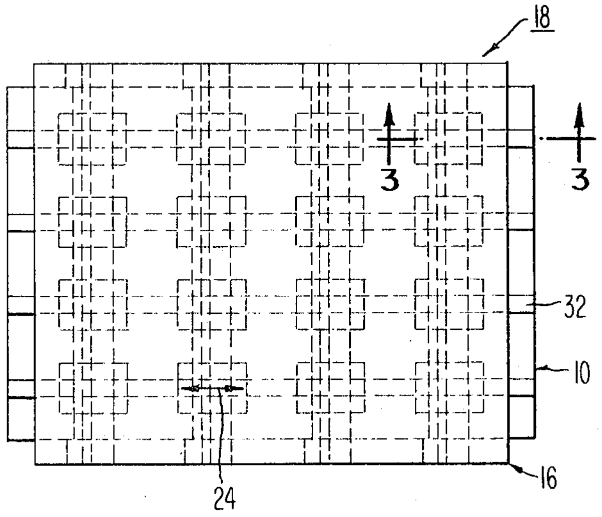
FIG. 2 is a plan view of the assembly of FIG. 1.
Figure 5:
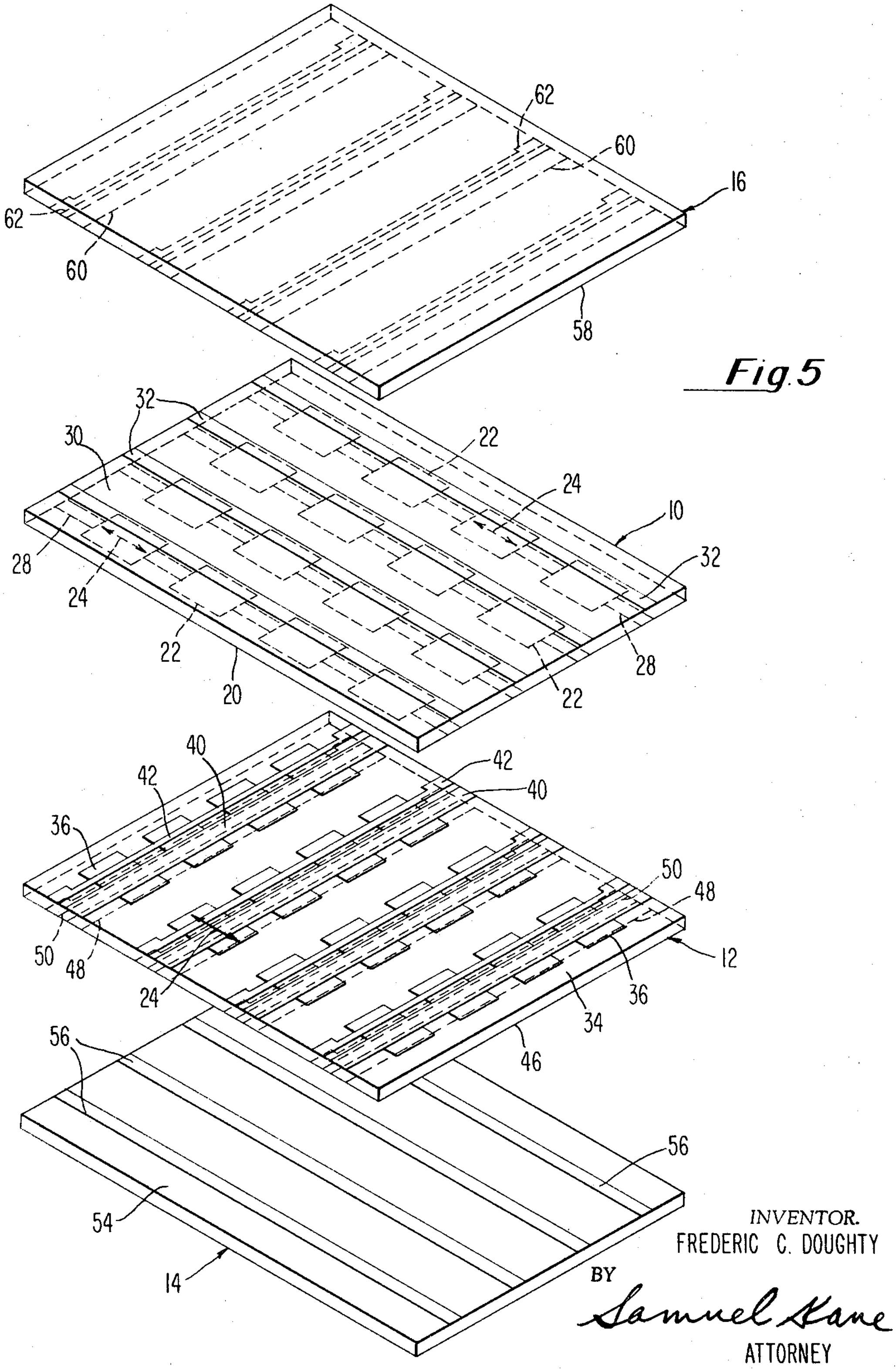
FIG. 5 is an isometric exploded view of the assembly of FIG. 1.

The substrate 10 (FIG. 5) is a panel of electrically insulating material such as glass, for example, and has deposited on its bottom surface 20 an array of elements of magnetic bistable state storage material in the form of thin film deposits 22. The thin films 22 are arranged with their easy or preferred axes of magnetization parallel and extending in the direction of the double-headed arrows 24 which represent the easy axes (see also FIG. 2).

After the thin films 22 are deposited on the surface 20 of the substrate 10, a thin layer of electrically insulating material 26 (FIG. 3), such as silicone monoxide, for example, is then deposited on the surface 20 and on the films 22. There is next deposited upon the silicone monoxide 26 a plurality of thin word line conductors 28 each intersecting and inductively coupled to a row of the thin films 22. In this connection, the references in the specification or claims to the thin character of the films, of the various conductors and of the various layers of silicone monoxide are intended to include various types of such elements which may be deposited in an ultrathin form by any one or more of several known methods, such as vacuum evaporation, painting, etching, etc.

On the top surface 30 of the substrate 10 and in superposed coinciding relation with the word lines 28 are deposited a plurality of thin word line return conductors 32 which, as will be pointed out hereinafter, are connected to the word lines 28 when the assembly 18 is connected into an operable circuit.

The substrate 12 (FIG. 5) is a panel of electrically insulating material such as glass, for example, similar to the panel 10, and has deposited on its top surface 34 a second array of thin films 36 of magnetic bistable state storage material which, similar to the thin films 22, have their easy or preferred axes of magnetization parallel and extending in the direction of the double-headed arrows 24 which also represent the easy axes of the films 36.

There is next deposited on the thin films 36 and on the surface 34 of the substrate 12 a thin layer of electrically insulating material 38, such as the silicone monoxide, mentioned previously. This is followed by a deposition of a plurality of thin digit line conductors 40 and thin sense line conductors 42 on top of the layer of silicone monoxide 38, and each conductor 40 and 42 intersects and is inductively coupled to a row of the thin films 36. On top of the digit and sense lines 40 and 42 and on top of the previously layer of silicone monoxide 38 there is deposited another layer of electrically insulating material 44, such as the silicone monoxide, mentioned previously. On the bottom surface 46 of the substrate 12 are deposited a group of thin digit line return conductors 48 and sense line return conductors 50. The digit lines 40 and the sense lines 42 are in superimposed coinciding relation with the return conductors 48 and 50, respectively. There is next placed on the bottom surface 46 of the substrate 12 and on the return conductors 48 and 50 a thin layer of electrically insulating material 52, such as the silicone monoxide, mentioned previously.

The substrate 14 is a panel of electrically insulating material preferably in the form of a glass epoxy and has deposited on its upper surface 54 a plurality of word line return conductors 56. Each word line 28 and its two associated return conductors 32 and 56 are in superposed coinciding relation, as may be preceived most clearly from FIGS. 1, 2 and 4.

The substrate 16 is an electrically insulating panel, also constructed preferably of a glass epoxy, and has deposited upon its lower surface 58 a plurality of thin digit line return conductors 60 and sense line return conductors 62. In the assembly 18 of FIG. 1, and as illustrated most clearly in FIG. 3, each digit line 40 and its associated pair of return conductors 48 and 60 are in superposed coinciding relation, and each sense line 42 and its associated pair of return conductors 50 and 62 are in superposed coinciding relation. On the bottom surface 58 of the substrate 16 and on the digit and sense line return conductors 60 and 62 there is deposited a thin layer of electrically insulating material 64, such as the silicone monoxide, mentioned previously. For purposes of simplicity, the various layers of silicone monoxide 26, 38, 44, 52 and 64, shown in FIG. 3, have been omitted from all other figures of the drawings.

The substrates 10 and 14 are preferably similarly dimensioned and oblong in shape (FIGS. 1 and 2), as are also the substrates 12 and 16, and all of the substrates are arranged in the assembly 18 so that adjacent substrates are orthogonal so that both ends of each conductor of each substrate are exposed for making external connections.

The invention thus provides a construction for magnetic thin film memory devices in which the magnetic thin film elements are arranged in layers in superposed relation, and in which the elements of each layer are positioned to coincide with the elements of the other layer to form pairs of elements. The elements of each layer are sufficiently close to the elements of the other layer so as to approach the maximum degree of magnetic flux coupling obtainable between the elements of each pair. It will also be noted that each word line 28, each digit line 40, and each sense line 42 extends between and is inductively coupled to each pair of thin films 22 and 36 of a row of such pairs of thin films.

In order to obtain the close flux coupling, it is preferable to use vacuum evaporation techniques to obtain the ultrathin depositions of the thin films, the conductors and the silicone monoxide insulating layers. Satisfactory results may be obtained by making the thickness of each of the various components of an assembly 18 approximately as follows:

| Components: | | |
|---|---|---|
| Substrates **10**, **12**, **16** | inches | 0.003 |
| Thin films **22**, **36** | angstrom | 1000 |
| Conductors **28**, **32**, **40**, **42**, **48**, **50**, **56**, **60**, **62** | angstroms | 10,000 |
| Silicone monoxide **26**, **38**, **44**, **52**, **54** | angstroms | 10,000 |

By utilizing depositions having thicknesses as above specified, it will be seen that the distance between each pair of thin films 22 and 36 is approximately 50,000 Angstroms.

Figure 1:
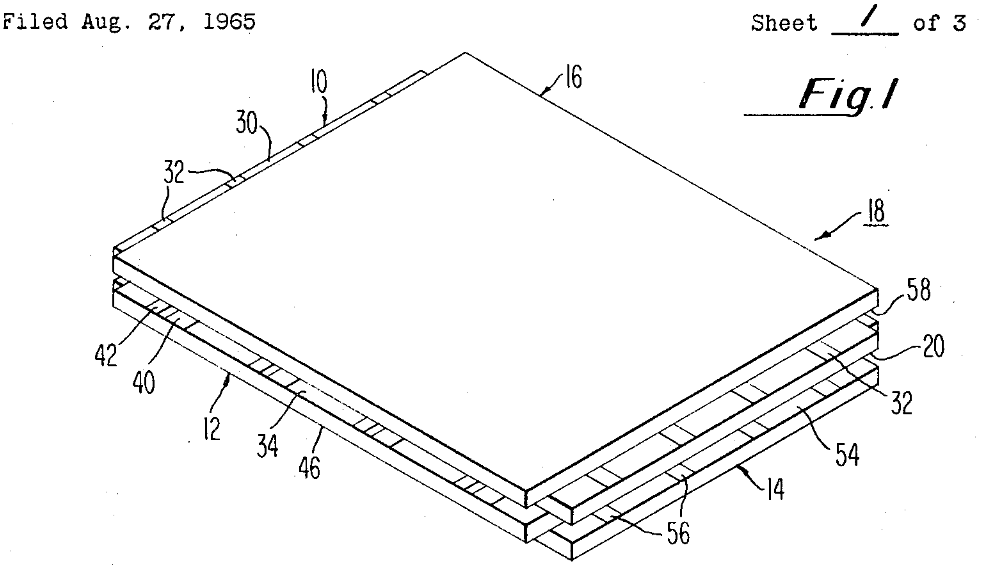
Figure 6:
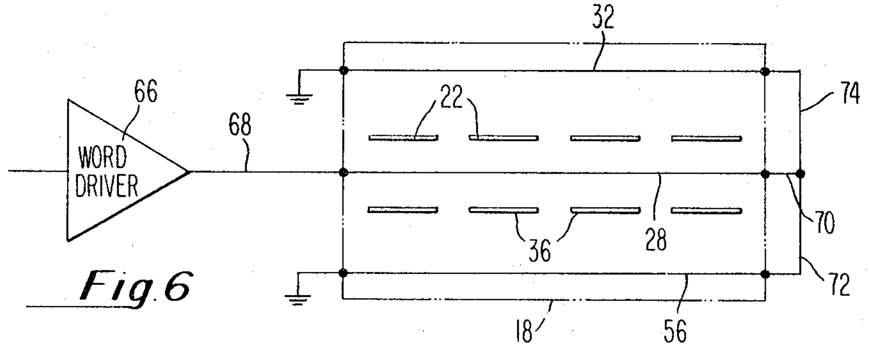
FIG. 6 is a schematic representation illustrating the connections of each one of certain input conductors or word lines of the assembly of FIG. 1.

A single assembly 18, such as the one shown in FIG. 1, may be utilized as a magnetic memory device when suitably connected to its associated circuitry. However, in order to obtain a desirable noise-cancelling feature by effectively transposing each sense line 42 and its associated pair of return conductors 50 and 62, it is preferable to connect two or more of such assemblies 18 in a particular circuit. For purposes of illustration, FIG. 7 has been drawn to show the connections of a sense line 42 and its return conductors 50 and 62 of two such assemblies 18, and FIG. 8 has been similarly drawn to show the connections of a digit line 40 and its return conductors 48 and 60 of the two assemblies. The connections of each word line 28, shown in FIG. 6, may be applied to circuits in which one or more assemblies 18 are used.

Each word line 28 is connected at one end to a word driver circuit 66 by means of a conductor 68 and at its other end to its return conductors 32 and 56 by means of an end connecting network consisting of conductors 70, 72 and 74.

Each sense line 42 and its return conductors 50 and 62 of the two assemblies 18 (FIG. 7), the assemblies being designated 18*a* and 18*b*, are interconnected by means of four transposing conductors 76, 78, 80 and 82.

The transposing conductor 76 connects the sense line 42 of the left assembly 18*a* to the return conductor 62 of the right assembly 18*b*, and the transposing conductor 78 connects the sense line 42 of the right assembly 18*b* to the return conductor 62 of the left assembly 18*a*. Similarly, the transposing conductor 80 connects the return conductor 50 of the assembly **18*a* to the sense line 42 of the assembly 18*b* and the transposing conductor 82 connects the sense line 42 of the assembly 18*a* to the return conductor 50 of the assembly 18*b*. The other end of the sense line 42 of the assembly 18*a* is connected to the return conductors 50 and 62 of the same assembly by means of an end network consisting of conductors 84, 86 and 88. The other end of the sense line 42 of assembly 18*b* is connected by means of a conductor 89 to the center tap of a transformer primary winding 90 whose end terminals are connected to the return conductors 50 and 62 of that assembly. The secondary winding 94 of the transformer is connected to the input terminals of a sense amplifier 96**.

Each digit line 40 (FIG. 8) of the assembly **18*a* and a digit line 40 of the assembly 18*b* are interconnected by a conductor 98, and their return conductors 48 and 60 of the two assemblies are interconnected by conductors 100 and 102, respectively. The other end of the digit line 40 of the assembly 18*b* is connected to the return conductors 48 and 60 of the same assembly by means of an end network consisting of conductors 104, 106 and 108. At its other end, the digit line 40 of the assembly 18*a* is connected to a digit driver circuit 110 by means of a conductor 112. The other ends of the return conductors 48 and 60 of the assembly 18*a* are connected to the digit driver circuit 110 by means of conductors 114, 116 and 118**.

Figure 3:
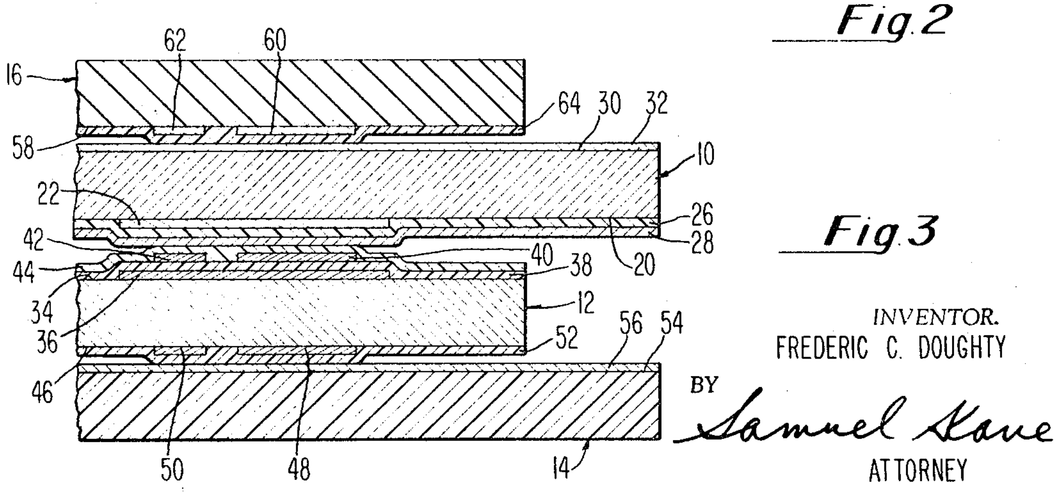
FIG. 3 is an enlarged fragmentary sectional view taken along line 3—3 of FIG. 2.
Figure 7:
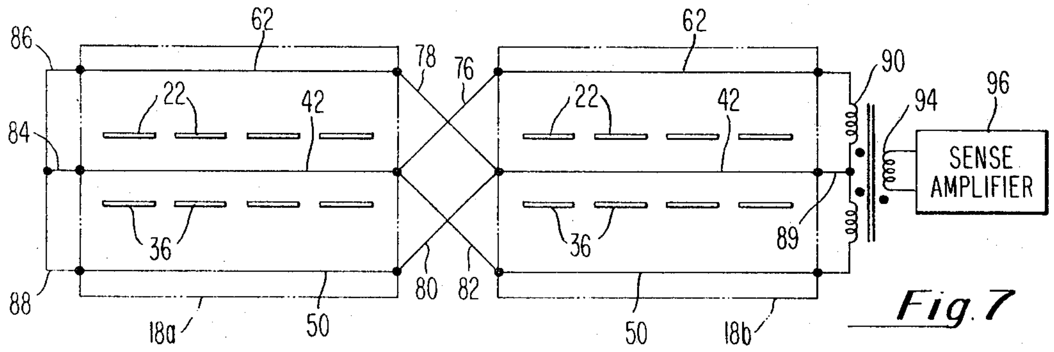
FIG. 7 is a schematic representation illustrating the connections of output conductors or sense lines of two assemblies into a single sense line.
Figure 8:
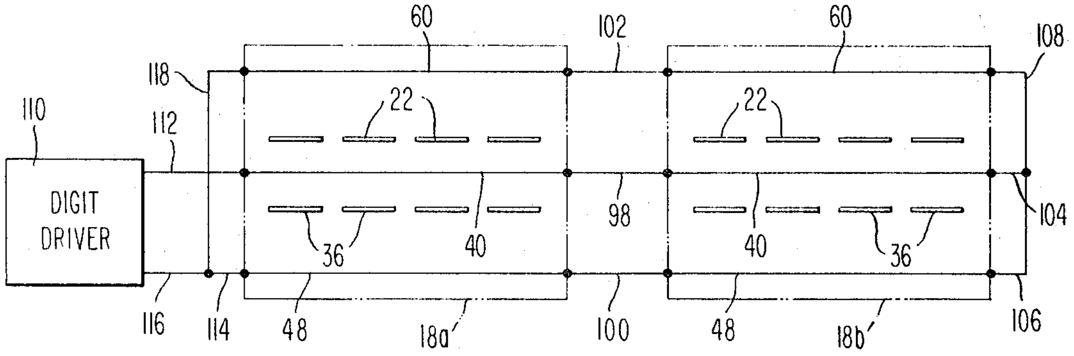
FIG. 8 is a schematic representation showing the connections of other input conductors or digit lines of two assemblies into a single digit line.

With reference to FIGS. 3, 7 and 8, it will be perceived that any noise induced in a sense line 42 by a current flowing in the adjacent digit line 40 will be substantially cancelled by reason of the connections obtained with the transposing conductors 76, 78, 80 and 82.

It may also be perceived that a current flowing from a word driver 66 (FIG. 6) through a word line 28 will divide equally and return to ground through the return conductors 32 and 56 which are grounded at the end nearest the input to the word line. Thus, the magnetic fields of currents flowing in the same direction in this pair of reutrn conductors 32 and 56 will tend to cancel each other in the region intermediate these return conductors, and that region is in the vicinity of the upper and lower layers of thin films. Thus, whenever a word line 28 is energized in a write or read operation on an associated pair of thin films 22 and 36 between which the word line 28 extends, the disturbing effect on adjacent pairs of thin films will be negligible, since the magnetic fields of the word line return currents in the return conductors 32 and 56 will substantially cancel each other in the region of the thin films. The same effect is obtained with the digit lines 40, since whenever a digit line 40 is energized in a write operation on an associated pair of thin films 22 and 36 between which the digit line 40 extends, the disturbing effect on adjacent pairs of thin films will also be negligible, since the magnetic fields of the digit line return currents in the return conductors 48 and 60 will similarly substantially cancel each other in the region of the thin films.

Various known methods of writing information into a pair of thin films and of reading or interrogating a pair of thin films to sense its state of magnetization are known in the art. However, for purposes of illustration, a preferred method of writing a bit of information into a pair of thin films will be described, as will also a preferred method of reading the magnetic status of a pair of thin films.

Figure 4:
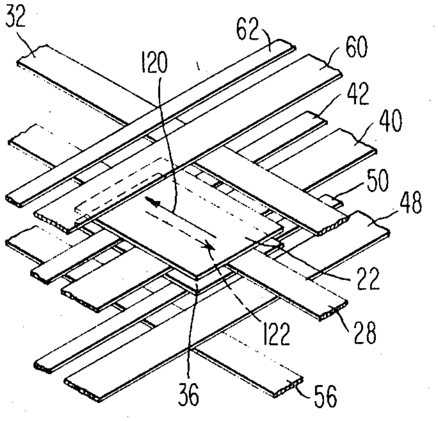
FIG. 4 is an enlarged fragmentary isometric view of certain of the components of the assembly of FIG. 1.
Figure 9:
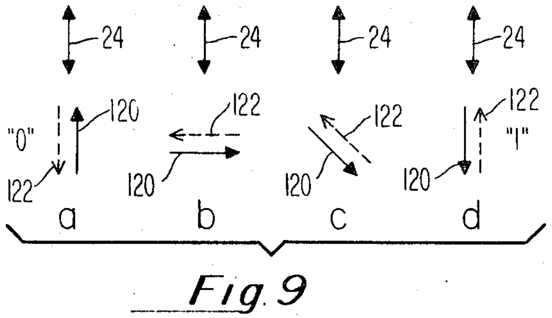
FIG. 9 is a vectorial representation of the magnetic induction vectors of a pair of magnetic storage media shown in FIG. 4, and illustrates the direction of these vectors at different times in a write operation.

It will be assumed that the pair of thin films 22 and 36, shown in FIG. 4, are in the binary "0" state and that their magnetic induction vectors 120 and 122, respectively, also shown in FIG. 9*a*, are parallel to their easy axes 24, but have opposite directions.

A write operation is provided by energizing the word line 28 which extends between the selected pair of thin films 22 and 36 with a drive write current from its word driver 66 whose magnetic field is transverse to the easy axis 24 and which rotates the magnetic induction vectors 120 and 122 of the pair of films to the hard direction, as illustrated in FIG. 9*b*. The digit line 40, which extends between the selected pair of thin films, is also energized with a drive write current from its digit driver 110 and whose magnetic field is parallel to the easy axis 24 and serves to impart a further rotation of the magnetic induction vectors 120 and 122 to the position shown in FIG. 9*c*. Now, if the transverse field is removed first by removing the word line 28 current, the longitudinal field of the digit line 40 will serve to complete the switching of the magnetic induction vectors 120 and 122 to the position shown in FIG. 9*d*, in which position they will remain when the digit line 40 current is removed, thus completing a write operation and placing the pair of thin films in the binary "1" state.

In order to provide a read or interrogation operation, only the word line 28 need be energized and this may be done with a current of either polarity so that the resulting magnetic field will cause the magnetic induction vectors of the selected pair of thin films to move to the hard direction, similar to that shown in FIG. 9*b*. The resulting flux change in the pair of thin films resulting from the movement of their magnetic induction vectors to the hard direction will induce a signal in the sense conductor 42 which extends between the selected pair of thin films and this signal will be detected by the associated sense amplifier 96 to which the sense conductor 42 is coupled.

It will now be apparent from the foregoing description that the invention provides improvements in magnetic storage devices whereby such devices may be constructed and connected more simply and operated more efficiently.

While there has been shown and described a specific device to exemplify the principles of the invention, it is to be understood that this is but one form of the invention and that the invention is capable of being constructed in a variety of shapes, sizes and modifications without departing from the true spirit and scope thereof. Accordingly, it is to be understood that the invention is not to be limited by the specific device disclosed, but only by the subjoined claims.

What is claimed is:

1. A magnetic memory device comprising a laminated assembly of first, second, third and fourth substrates arranged from top to bottom in that order, said second substrate having on its lower surface a layer of thin films of bistable state magnetic storage material, said third substrate having on its upper surface a layer of thin films of bistable state magnetic storage material, the films of each said layer being positioned to coincide with the films of the other layer to form pairs of films and so as to establish flux coupling between the films of each said pair of films, each of said films having an easy axis of magnetization and the magnetic induction vectors of the films of each pair of films being in different directions, a first plurality of elongate thin input conductors each placed on the lower surface of said second substrate and inductively coupled to and extending between each pair of films of a plurality of said pairs of films and for receiving a drive current, a second plurality of elongate thin input conductors each placed on the upper surface of said third substrate and inductively coupled to and extending between each pair of films of a plurality of said pairs of films and for receiving a drive current, a plurality of elongate thin output conductors each placed on the upper surface of said third substrate and inductively coupled to and extending between each pair of films of a plurality of said pairs of films for receiving an induced signal current whenever a pair of its associated films is interrogated, and a plurality of pairs of elongate thin return conductors each pair adapted to be connected to an individual one of said input and output conductors so as to receive an approximately equally divided current from its associated input or output conductor, and wherein return conductors are placed on each of said substrates, each pair of return conductors is arranged in mutual magnetic flux-cancelling relation, and the conductors of each substrate are non-intersecting.

2. A magnetic memory device according to claim 1 wherein the individual return conductors of each pair which are adapted to be connected to an input conductor of said first plurality are placed respectively on the upper surface of said second substrate and the upper surface of said fourth substrate, the individual return conductors of each pair which are adapted to be connected to an input conductor of said second plurality are placed respectively on the lower surface of said first substrate and the lower surface of said third substrate, and the individual return conductors of each pair which are adapted to be connected to an output conductor are placed respectively on the lower surface of said first substrate and the lower surface of said third substrate.

3. A plurality of adjacent magnetic memory devices each according to claim 2, and characterized further by the provision of conductive means connecting one end of each output conductor of each memory device to one end of a pair of return conductors of an adjacent memory device which are adapted to be connected to one of the output conductors of said adjacent memory device, and conductive means connecting the other end of each of said last mentioned output conductors to the other end of a pair of said last mentioned return conductors of the same memory device.

4. A magnetic memory device according to claim 2 characterized further in that alternate ones of said substrates are oblong, the other ones of said substrates extend crosswise relative to said alternate substrates and have a crosswise length which is greater than the width of said alternate substrates, the conductors of each of said alternate substrates are parallel to the long dimension of their associated substrate and extend from edge to edge thereof, the conductors of each of said other substrates are parallel to said crosswise length of their associated substrate and extend from edge to edge thereof, and the conductors of adjacent substrates are orthogonal such that both ends of each conductor of each substrate are exposed for making external connections.

5. A magnetic memory device according to claim 2 wherein each of said input and output conductors is plated to a thickness of approximately 10,000 Angstroms on said surface on which it is placed and across its associated thin films which are on the same substrate.

6. A magnetic memory device according to claim 2 wherein the distance between each pair of films is approximately 50,000 Angstroms.

7. A magnetic memory device according to claim 2 wherein each of said input and output conductors and said pair of return conductors adapted to be connected to it are in parallel, superposed, coinciding relation.

8. A magnetic memory device according to claim 5 wherein each return conductor on said second and third substrates is a plating approximately 10,000 Angstroms thick, and each of said input and output conductors and the individual conductors of said pair of return conductors adapted to be connected to it are substantially equally spaced.

References Cited

UNITED STATES PATENTS

| | | | |
|---|---|---|---|
| 3,121,177 | 2/1964 | Davis. | |
| 3,175,201 | 3/1965 | Slonczewski. | |
| 3,191,162 | 6/1965 | Davis. | |
| 3,200,383 | 8/1965 | James. | |
| 3,213,430 | 10/1965 | Oshima et al. | |
| 3,247,470 | 4/1966 | Read. | |
| 3,270,327 | 8/1966 | Davis. | |
| 3,298,005 | 1/1967 | Matick. | |
| 3,302,190 | 1/1967 | Boylan et al. | |
| 3,371,325 | 2/1968 | Hounsfield | 340—174 |

STANLEY M. URYNOWICZ, *Primary Examiner.*